United States Patent
Nakamoto

(10) Patent No.: US 8,155,533 B2
(45) Date of Patent: Apr. 10, 2012

(54) OPTICAL TRANSMITTING APPARATUS AND OPTICAL COMMUNICATION SYSTEM

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 671 days.

(21) Appl. No.: 12/318,522

(22) Filed: Dec. 30, 2008

(65) Prior Publication Data

US 2009/0297165 A1    Dec. 3, 2009

(30) Foreign Application Priority Data

May 29, 2008   (JP) ................... 2008-141495

(51) Int. Cl.
*H04B 10/04* (2006.01)

(52) U.S. Cl. ........ 398/184; 398/185; 398/186; 398/188; 398/154

(58) Field of Classification Search .......... 398/184–186, 398/188, 154

See application file for complete search history.

(56) References Cited

U.S. PATENT DOCUMENTS

| 6,711,360 B1* | 3/2004 | Wu ............................. 398/182 |
| 7,024,056 B2* | 4/2006 | Griffin ......................... 385/1 |
| 2004/0061922 A1* | 4/2004 | Mauro et al. ................ 359/279 |

FOREIGN PATENT DOCUMENTS

| JP | 9-23193 | 1/1997 |
| JP | 2006-33213 | 2/2006 |

OTHER PUBLICATIONS

L. E. Nelson and Herwig Kogelnik; "Coherent crosstalk impairments in polarization multiplexed transmission due to polarization mode dispersion"; Optics Express; vol. 7, No. 10; Nov. 6, 2000.

* cited by examiner

*Primary Examiner* — Leslie Pascal
(74) *Attorney, Agent, or Firm* — Staas & Halsey LLP

(57) ABSTRACT

A waveform converting unit gives a change to a clock signal as a periodic voltage fluctuation that drives a pulse carver unit carrying out shaping into an RZ waveform. The pulse carver unit receives a bias voltage applied thereto from a bias voltage applying unit, is driven by the clock signal that is given a change by the waveform converting unit and that is amplified by an amplifying unit, and outputs an RZ pulse whose duty has been changed.

4 Claims, 10 Drawing Sheets

OPTICAL TRANSMITTING APPARATUS AND OPTICAL COMMUNICATION SYSTEM

CROSS-REFERENCE TO RELATED APPLICATIONS

This application is based upon and claims the benefit of priority of the prior Japanese Patent Application No. 2008-141495, filed on May 29, 2008, the entire contents of which are incorporated herein by reference.

BACKGROUND

1. Field

The present invention relates to an optical transmitting apparatus that converts input data into an optical signal shaped into an RZ (Return-to-Zero) pulse and that synthesizes two optical signals of the same wavelength by setting their polarization states orthogonal to each other to transmit the synthesized optical signal, and to an optical communication system having the optical transmitting apparatus and an optical receiving apparatus to which an optical signal is transmitted.

2. Description of the Related Art

WDM (Wavelength Division Multiplex) has been known as a conventional technology in optical communication, by which technology a plurality of optical signals having different wavelengths are passed simultaneously through an optical fiber to transmit a large volume of information.

In WDM, generally, increasing the number of wavelengths or narrowing intervals between channels increases the volume of information that can be transmitted at once. Another method of increasing the volume of transmittable information has been known as a method of synthesizing two optical signals having the same wavelengths by setting their polarization states orthogonal to each other (see, e.g., Japanese Patent Application Laid-open No. H09-23193).

When an optical receiving apparatus that receives an optical signal receives such synthesized light, the optical receiving apparatus divides the synthesized light into two optical signals, and carries out a signal process on each divided optical signal to acquire data.

When the above synthesized light travels through an optical fiber in a long distance, polarization mode dispersion characteristic of the optical fiber occurs to break the orthogonal polarization relation between two optical signals, which causes both optical signals to exert effects each other. As a result, optical signals divided apart at the optical receiving apparatus have quality substantially inferior to an optical signal that is transmitted as a single optical signal.

When two optical signals are synthesized by setting their polarization states orthogonal to each other, therefore, the optical receiving apparatus has no other choice but to carry out the signal process on a heavily deteriorated optical signal. This leads to a problem of the occurrence of an error of data contents. Hence it has been required that even when the orthogonal relation between polarization states of two optical signals are broken due to polarization mode dispersion, effects exerted each other by both optical signals should be suppressed.

SUMMARY

It is an object of the present invention to at least partially solve the problems in the conventional technology.

According to an aspect of an embodiment, an optical transmitting apparatus that converts input data into an optical signal shaped into an RZ pulse, and synthesizes two optical signals of the same wavelength by setting polarization states of the two optical signals orthogonal to each other to transmit the synthesized signal, includes a clock signal shape changing unit that changes a clock signal as a periodical voltage fluctuation to drive a pulse shaping unit that converts the input data into the optical signal shaped into the RZ pulse; and a duty adjusting unit that controls the clock signal shape changing unit to adjust a duty of the clock signal.

According to another aspect of an embodiment, an optical transmitting apparatus that converts input data into an optical signal shaped into an RZ pulse, and synthesizes two optical signals of the same wavelength by setting polarization states of the two optical signals orthogonal to each other to transmit the synthesized signal, includes a bias voltage changing unit that gives a deflection to a reference bias voltage value applied to a pulse shaping unit that converts the input data into the optical signal shaped into the RZ pulse; and a deflection adjusting unit that controls the bias voltage changing unit to adjust the deflection.

According to still another aspect of an embodiment, an optical communication system includes an optical transmitting apparatus that converts input data into an optical signal shaped into an RZ pulse, and synthesizes two optical signals of the same wavelength by setting polarization states of the two optical signals orthogonal to each other to transmit the synthesized signal; and an optical receiving apparatus to which the optical signal is transmitted, wherein the optical receiving apparatus includes an informing unit that informs the optical transmitting apparatus of an error rate of the optical signal, and wherein the optical transmitting apparatus includes a clock signal shape changing unit that changes a clock signal as a periodical voltage fluctuation to drive a pulse shaping unit that converts the input data into the optical signal shaped into the RZ pulse; and a duty adjusting unit that controls the clock signal shape changing unit to adjust a duty of the clock signal, based on the error rate informed of by the informing unit.

According to still another aspect of an embodiment, an optical communication system includes an optical transmitting apparatus that converts input data into an optical signal shaped into an RZ pulse, and synthesizes two optical signals of the same wavelength by setting polarization states of the two optical signals orthogonal to each other to transmit the synthesized signal; and an optical receiving apparatus to which the optical signal is transmitted, wherein the optical transmitting apparatus includes a clock signal shape changing unit that changes a clock signal as a periodical voltage fluctuation to drive a pulse shaping unit that converts the input data into the optical signal shaped into the RZ pulse, using given control information, and wherein the optical receiving apparatus includes a control information transmitting unit that generates the control information, based on an error rate of the optical signal, to transmit the control information to the clock signal shape changing unit.

According to still another aspect of an embodiment, an optical communication system includes an optical transmitting apparatus that converts input data into an optical signal shaped into an RZ pulse, and synthesizes two optical signals of the same wavelength by setting polarization states of the two optical signals orthogonal to each other to transmit the synthesized signal; and an optical receiving apparatus to which the optical signal is transmitted, wherein the optical receiving apparatus includes an informing unit that informs the optical transmitting apparatus of an error rate of the optical signal, and wherein the optical transmitting apparatus includes a bias voltage changing unit that gives a deflection to a reference bias voltage value applied to a pulse shaping unit that converts the input data into the optical signal shaped into the RZ pulse; and a deflection adjusting unit that adjusts the deflection through the bias voltage changing unit, based on the error rate informed of by the informing unit.

According to still another aspect of an embodiment, an optical communication system includes an optical transmitting apparatus that converts input data into an optical signal shaped into an RZ pulse, and synthesizes two optical signals of the same wavelength by setting polarization states of the two optical signals orthogonal to each other to transmit the synthesized signal; and an optical receiving apparatus to which the optical signal is transmitted, wherein the optical transmitting apparatus includes a bias voltage changing unit that gives a deflection to a reference bias voltage value applied to a pulse shaping unit that converts the input data into the optical signal shaped into the RZ pulse, using given control information; and wherein the optical receiving apparatus includes a control information transmitting unit that generates the control information, based on an error rate of the optical signal, to transmit the control information to the bias voltage changing unit.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Exemplary embodiments of an optical communication system according to the present invention will now be described in detail with reference to the accompanying drawings.

Figure 1:
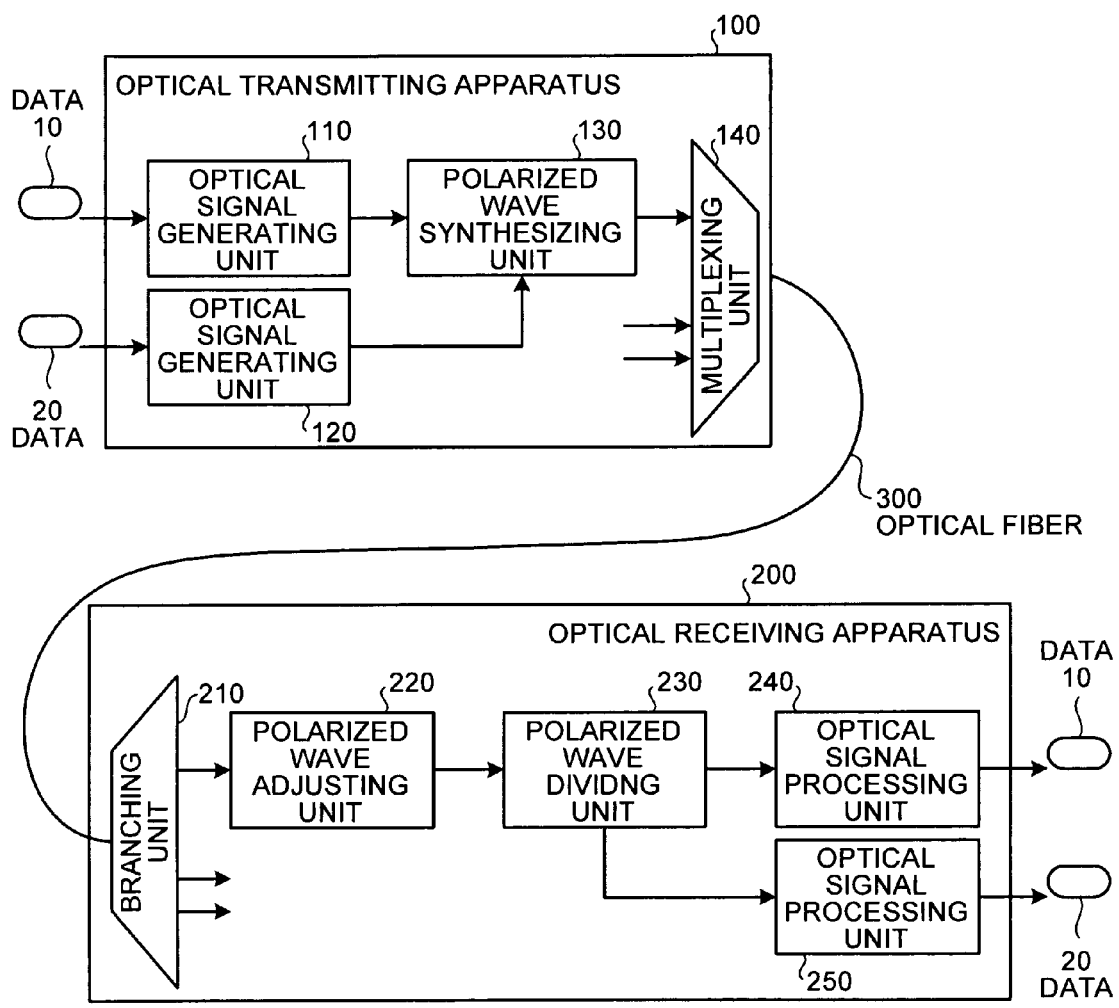
FIG. 1 is an explanatory view of a scheme of an optical communication system.

A schematic of the optical communication system will first be described referring to FIG. 1. FIG. 1 is an explanatory view of the scheme of the optical communication system.

As shown in FIG. 1, the optical communication system includes an optical transmitting apparatus 100, an optical receiving apparatus 200, and an optical fiber 300 that connects the optical transmitting apparatus 100 to the optical receiving apparatus 200.

The optical transmitting apparatus 100 receives data 10 and data 20 that are input to the optical transmitting apparatus 100. The data 10 and the data 20 are electric signals, and are, for example, transmitted from a terminal (not shown) to travel through a network (public telephone network, Internet, etc.) to come into the optical transmitting apparatus 100.

The optical transmitting apparatus 100 converts input data as an electric signal into an optical signal. In this conversion, the data 10 and the data 20 are converted by an optical signal generating unit 110 and an optical signal generating unit 120, respectively, into optical signals having the same wavelength. The optical transmitting apparatus 100 causes a polarized wave synthesizing unit 130 to synthesize two optical signals by setting their polarization states orthogonal to each other. This means that the optical signal of the data 20 comes to have an oscillation direction that makes right angles with the oscillation direction of the optical signal of the data 10. The optical transmitting apparatus 100 then causes a multiplexing unit 140 to multiplexing an optical signal synthesized by the polarized wave synthesizing unit 130 together with optical signals of different wavelengths synthesized by other polarized wave synthesizing units (not shown) and transmit the multiplexed signal to the optical receiving apparatus 200.

Upon receiving the multiplexed optical signal, the optical receiving apparatus 200 causes a branching unit 210 to divide the multiplexed signal into optical signals each having a different wavelength. In the optical receiving apparatus 200, the optical signal as synthesized light created by synthesizing optical signals generated based on the data 10 and 20 is adjusted in polarization state by a polarized wave adjusting unit 220, and is input to a polarized wave dividing unit 230. Subsequently, in the optical receiving apparatus 200, the input optical signal is divided into two optical signals by the polarized wave dividing unit 230, and one optical signal is converted into an electric signal by an optical signal processing unit 240 while the other optical signal is converted into an electric signal by an optical signal processing unit 250. Hence the converted electric signals are acquired as the data 10 and the data 20, which are, for example, transmitted to a terminal (not shown) via a network. This is the description of the scheme of the optical communication system.

The polarization states of the optical signals synthesized at the optical transmitting apparatus 100 remain orthogonal to each other immediately after the synthesized light is transmitted. As the synthesized light travels through the optical fiber, however, the polarization states change to lose their state of orthogonality. This situation is indicated by the equation 11 in L. E. Nelson and Herwig Kogelink, "Coherent crosstalk impairments in polarization multiplexed transmission due to polarization mode dispersion", [Online],

[searched on Apr. 14, 2008], Internet <URL: http://www.opticsinfobase.org/DirectPDFAccess/4BDOCFFB-BDB9-137E-C91CB1778E909AAC__63523.pdf?da=1&id=63523&seq=0CFID=135517&CFTOKEN=65790645>

According to the above literature, when optical signals A and B are synthesized by setting their polarization states orthogonal to each other, the optical signal A received at the optical receiving apparatus 200 is given by the equation 1 as a result of the effect of polarization mode dispersion (PDM).

$$A\text{out}(t) = A + (\Delta\tau/2) * dB/dt \quad (1)$$

The second term at the right side of the equation 1 represents an effect that the optical signal B exerts on the optical signal A. In the equation 1, $\Delta\tau$ denotes a differential group delay (DGD).

Figure 2:
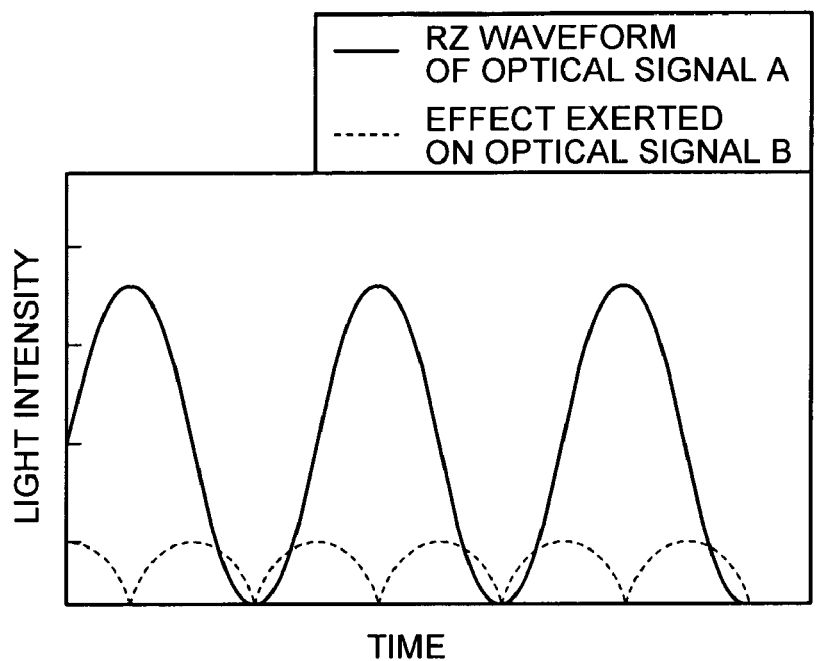
FIG. 2 is a diagram of an effect that an optical signal A modulated by RZ-DPSK exerts on an optical signal B.

When two optical signals A and B whose polarization states are set orthogonal to each other are modulated by a modulation method of, for example, RZ-DPSK (Differential Phase Shift Keying), the optical signals A and B take shapes of approximate sine waves because CW (Current Wave) light is modulated in intensity in RZ-DPSK, and time differentiation of the sine waves produces cosine waves. FIG. 2 depicts an effect that the optical signal A modulated by RZ-DPSK exerts on the optical signal B. As shown in FIG. 2, a waveform having a peak at a position that is shifted in delay from the center of a mountain portion in the waveform (RZ (Return-to-Zero) waveform) of the optical signal A by one-fourth period exerts the effect on the polarization multiplexed optical signal B.

Figure 3:
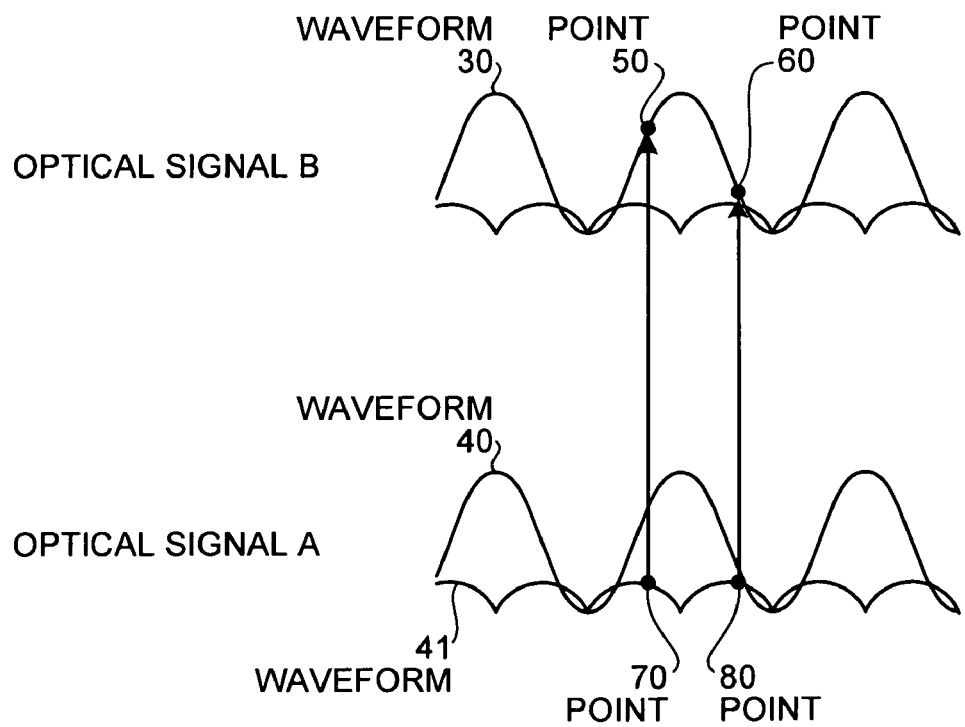
FIG. 3 is an explanatory view of an effect that the optical signal A exerts on the optical signal B.

The effect that the optical signal A exerts on the optical signal B will be described specifically referring to FIG. 3. In FIG. 3, the optical signal B is represented as a waveform 30 while the optical signal A is represented as a wave form 40 in a coordinate plane with the horizontal axis representing time and the vertical axis representing light intensity, where the effect that the optical signal A exerts on the optical signal B is represented as a waveform 41. For example, the light intensity of portions represented as points 70 and 80 on the waveform 41 is added to the light intensity of portions represented as points 50 and 60 on the waveform 30. In FIG. 3, the phase of the optical signal A and that of the optical signal B are virtually identical. If, however, this phase relation shifts, the light intensity of the portions represented as the points 70 and 80 is added to portions on the waveform 30 that are different from the portions represented as points 50 and 60.

Figure 4:
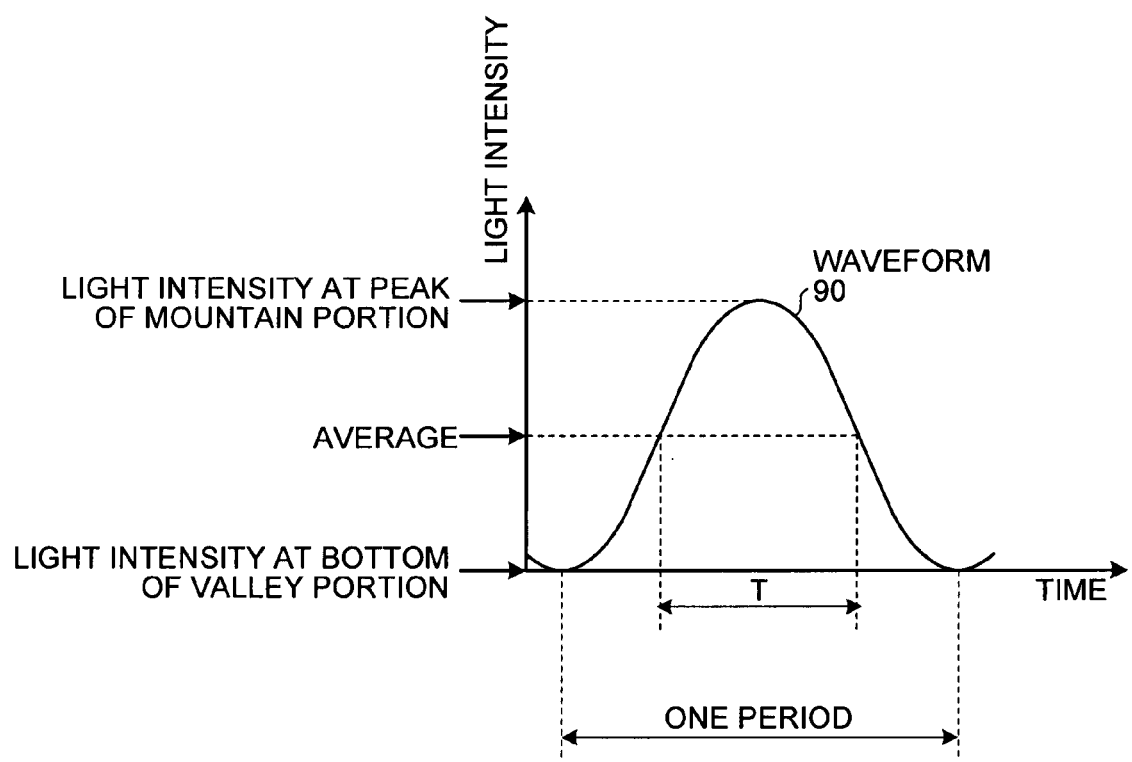
FIG. 4 is an explanatory view of the definition of duty.

The optical receiving apparatus 200 determines a digital value of 1 or 0 at the central portions of the RZ waveform. For this reason, a case of an effect exerted on one polarization multiplexed optical signal, as shown in FIG. 3, poses the gravest problem. To prevent this, the exertion of the effect on the central portions is prevented by changing the duty of the RZ waveform. The definition of duty will be described referring to FIG. 4. FIG. 4 depicts an arbitrary optical signal waveform 90 plotted in a coordinate plane with the horizontal axis representing time and the vertical axis representing light intensity. In FIG. 4, the duty of the waveform 90 is the ratio of a period (T) in which light intensity exceeds the average ((C+D)/2) of light intensity (C) at the bottom of a valley portion and light intensity (D) at the peak of a mountain portion, to one period (T/1 cycle).

Figure 5A:
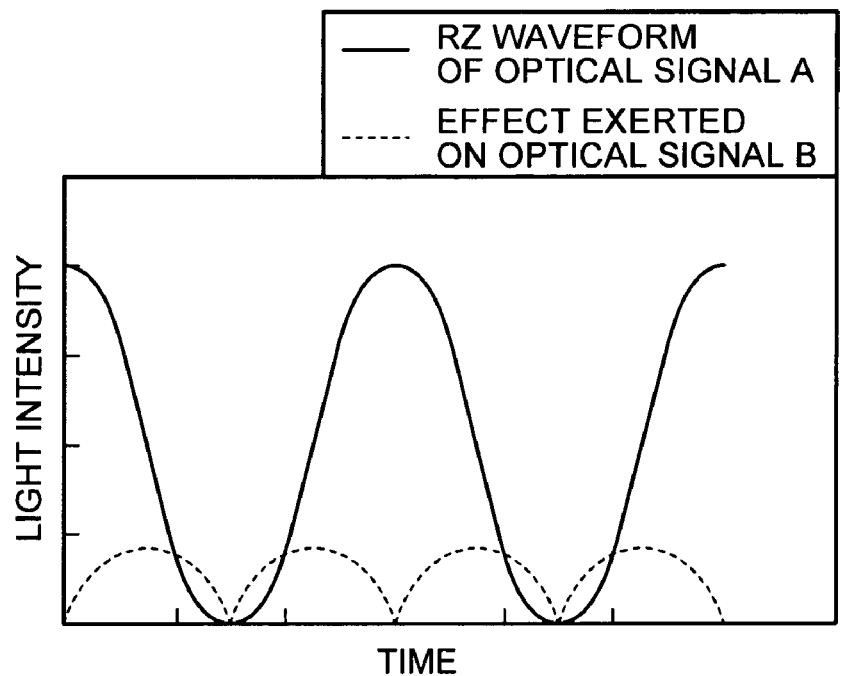
FIG. 5A is a diagram of the RZ waveform of the optical signal A whose duty is 50%.
Figure 5B:
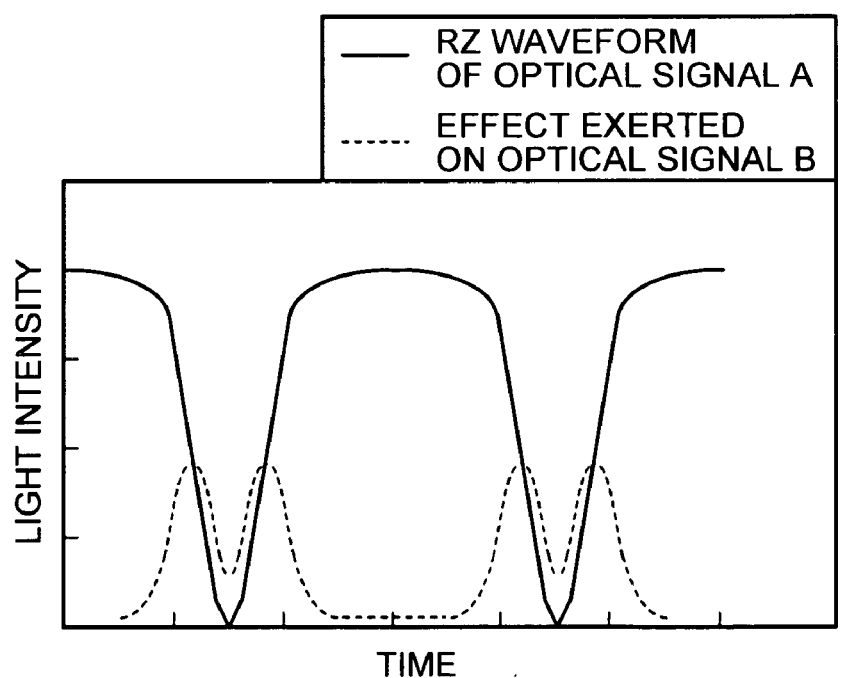
FIG. 5B is a diagram of the RZ waveform of the optical signal A whose duty is 70%.

As shown in FIG. 5A, the mountain portions of the RZ waveform of the optical signal A having duty of 50% have pointed peaks. If the duty is changed to 70%, however, the RZ waveform comes to have smoothed peaks, as shown in FIG. 5B.

A waveform resulting from time differentiation of the RZ waveform represents an effect exerted on the optical signal B.

As shown in FIG. 5A, a waveform resulting from time differentiation of the optical signal A having duty of 50% accompanies an extremely short period in which the effect exerted on the optical signal B hardly exists. In contrast, as shown in FIG. 5B, a waveform resulting from time differentiation of the optical signal A having duty of 70% accompanies a long period in which the effect exerted on the optical signal B hardly exists. In this case, the effect is hardly exerted on the central portions if the phase of the optical signal A and that of the optical signal B are identical. When the optical transmitting apparatus 100 shapes each optical signal into an RZ pulse, therefore, shaping the optical pulse into such a waveform as shown in FIG. 5B enables suppression of an effect that one optical signal exerts on the other optical signal.

Figure 6:
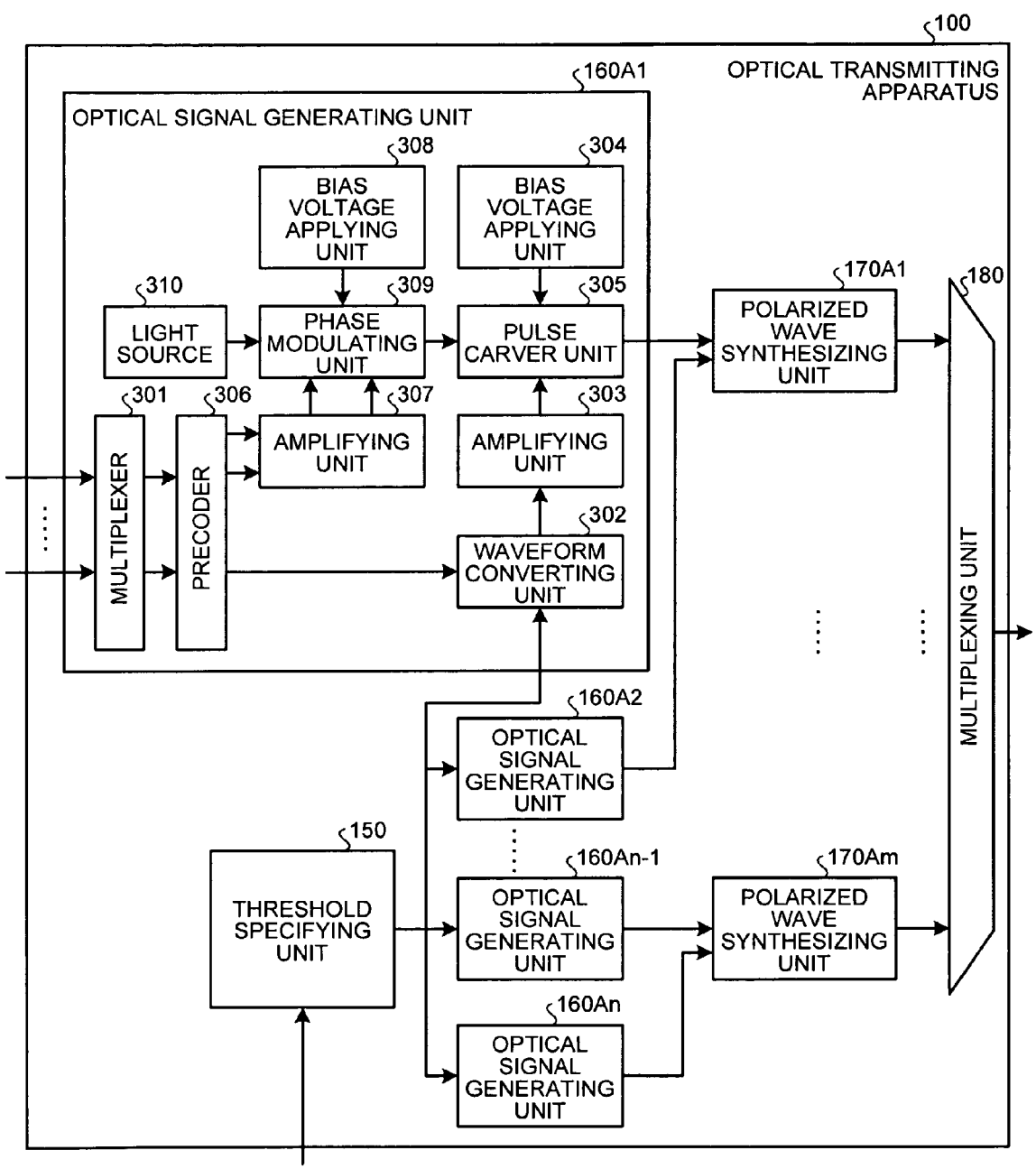
FIG. 6 is a block diagram of a configuration of an optical transmitting apparatus according to a first embodiment.

A configuration of an optical transmitting apparatus according to a first embodiment will now be described referring to FIG. 6. FIG. 6 is a block diagram of the configuration of the optical transmitting apparatus of the first embodiment.

As shown in FIG. 6, the optical transmitting apparatus 100 includes a threshold specifying unit 150, optical signal generating units 160A1 to 160An, polarized wave synthesizing units 170A1 to 170Am (m is one half of n), and a multiplexing unit 180. The optical signal generating unit 160A1 and the optical signal generating unit 160A2 correspond to the optical signal generating unit 110 and the optical signal generating unit 120 shown in FIG. 1, respectively. Likewise, the polarized wave synthesizing unit 170A1 corresponds to the polarized wave synthesizing unit 130 and the multiplexing unit 180 corresponds to the multiplexing unit 140.

The threshold specifying unit 150 gives a prescribed value to a waveform converting unit 302, which will be described later, to control the extent of a duty change. Specifically, the threshold specifying unit 150 determines a threshold used by the waveform converting unit 302, based on an optical signal error rate at the optical receiving apparatus 200, and outputs the determined threshold to the waveform converting unit 302.

For example, the threshold specifying unit 150 receives error rate information from the optical receiving apparatus 200 at constant intervals, and compares an error rate with a prescribed value. The threshold specifying unit 150 then outputs a threshold "0.2" to the waveform converting unit 302 when the error rate exceeds the prescribed value, while outputs a threshold "0.5" to the waveform converting unit 302 when the error rate is equal to or smaller than the prescribed value. The threshold may be determined based on the result of comparison between a currently received error rate and a previously received error rate. When FEC (Forward Error Correction) is carried out in the optical communication system of FIG. 1, for example, a value calculated at a processing unit carrying out error correction is used as an error rate in the optical receiving apparatus 200.

Each of the optical signal generating units 160A1 to 160An is a signal processing unit that converts data input to the optical transmitting apparatus 100 as an electric signal into an optical signal. Each of the optical signal generating units has a multiplexer 301, the waveform converting unit 302, an amplifying unit 303, a bias voltage applying unit 304, a pulse carver unit 305, a precoder 306, an amplifying unit 307, a bias voltage applying unit 308, a phase modulating unit 309, and a light source 310. Each two units out of the optical signal generating units 160A1 to 160An make a set of optical signal generating units, which generate optical signals of the same wavelength. The wavelengths of optical signals generated by the optical signal generating units 160A1 to 160An are different for each set of optical signal generating units.

The multiplexer 301 receives a plurality of data bits simultaneously from a plurality of signal lines, and outputs data to the precoder 306 connected to the multiplexer 301 via signal lines. The multiplexer 301 also receives a clock signal as a periodical voltage fluctuation that drives the pulse carver unit 305. The clock signal is output to the waveform converting unit 302 via the precoder 306. The clock signal is, for example, transmitted from a separately provided dedicated device to the optical transmitting apparatus 100.

The waveform converting unit 302 has a function of giving a change to a clock signal, and is provided as, for example, an AND circuit. Specifically, the waveform converting unit 302 receives a threshold given by the threshold specifying unit 150, and determines a digital value of 1 or 0, based on a determination on whether the voltage of an input clock signal exceeds the threshold.

Figure 7:
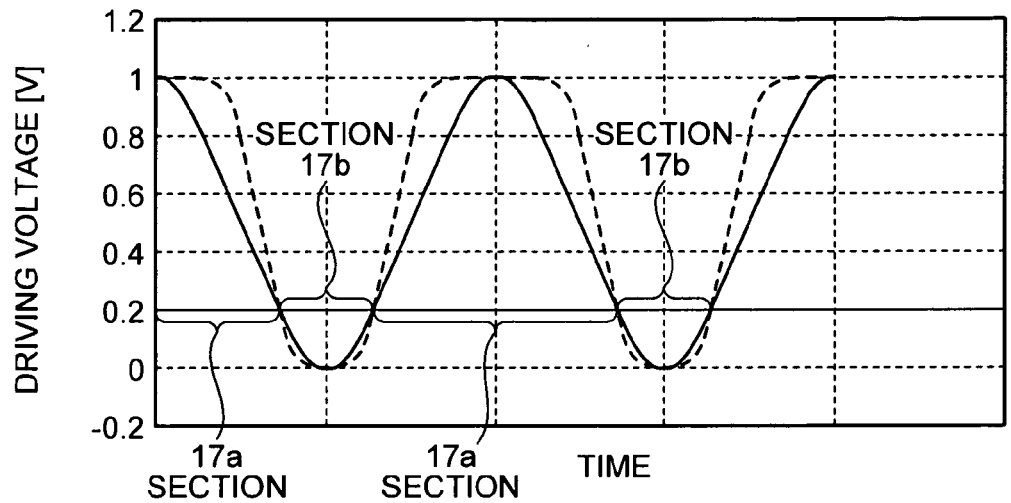
FIG. 7 is an explanatory view of a change that a waveform converting unit gives to a clock signal.

A change that the waveform converting unit 302 gives to a clock signal will be described referring to FIG. 7. As shown in FIG. 7, a clock signal represented by a solid line waveform is input to waveform converting unit 302. For example, when given a threshold "0.2", the waveform converting unit 302 determines a digital value to be 1 in a section 17a, while determines a digital value to be 0 in a section 17b. As a result, the waveform converting unit 302 outputs a clock signal represented by a dotted line waveform in FIG. 7. The initial value of a threshold given to the waveform converting unit 302 is determined to be, for example, 0.5. The clock signal is amplified by the amplifying unit 303, and then is input to the pulse carver unit 305.

Referring to FIG. 7, comparing the duty of the clock signal input to the waveform converting unit 302 with the duty of the clock signal output from the waveform converting unit 302 demonstrates that the duty of the clock signal output from the waveform converting unit 302 is larger. The pulse carver unit 305 shapes an RZ pulse, based on a clock signal. By enlarging the duty of the clock signal, therefore, the duty of an RZ waveform can be changed, for example, from 50% to 70%. Through this process, an effect that one optical signal exerts on the other optical signal can be suppressed, as described above.

The bias voltage applying unit 304 applies a bias voltage that drives the pulse carver unit 305 to the pulse carver unit 305.

The pulse carver unit 305 is driven by a voltage applied thereto from the bias voltage applying unit 304 and by a clock signal, and shapes light output from the phase modulating unit 309 into an RZ pulse. The pulse carver unit 305 is provided as, for example, an LN (LiNb03) modulator.

When receiving data from the multiplexer 301, the precoder 306 calculates the exclusive-OR of data shifted by 1 bit and the original data, and generates a logical calculation result data. The precoder 306 then applies a voltage based on the generated data together with a voltage having an inverted voltage value to the phase modulating unit 309. The amplifying unit 307 amplifies the voltages applied by the precoder 306.

The bias voltage applying unit 308 applies a bias voltage that drives the phase modulating unit 309 to the phase modulating unit 309.

The phase modulating unit 309 is driven by the voltages applied thereto from the bias voltage applying unit 308 and the precoder 306 to carry out phase modulation by the DPSK (Differential Phase Shift Keying) method on CW light output from the light source 310. The optical signal modulated by the phase modulation unit 309 is input to the pulse carver unit 305. The phase modulating unit 309 is also provided as an LN modulator. The modulation method adopted in phase modulation may be DQPSK (Differential Quadrature Phase Shift Keying).

Each of the polarized wave synthesizing units 170A1 to 170An receives optical signals each having the same wavelength from two optical signal generating units and sets the polarization states of the optical signals orthogonal to each other to synthesize two optical signals.

The multiplexing unit 180 receives synthesized light of different wavelengths output from the polarized wave synthesizing units 170A1 to 170An, and multiplexes the synthesized light by the WDM (Wavelength Division Multiplex) method to output multiplexed light to the optical fiber.

Figure 8:
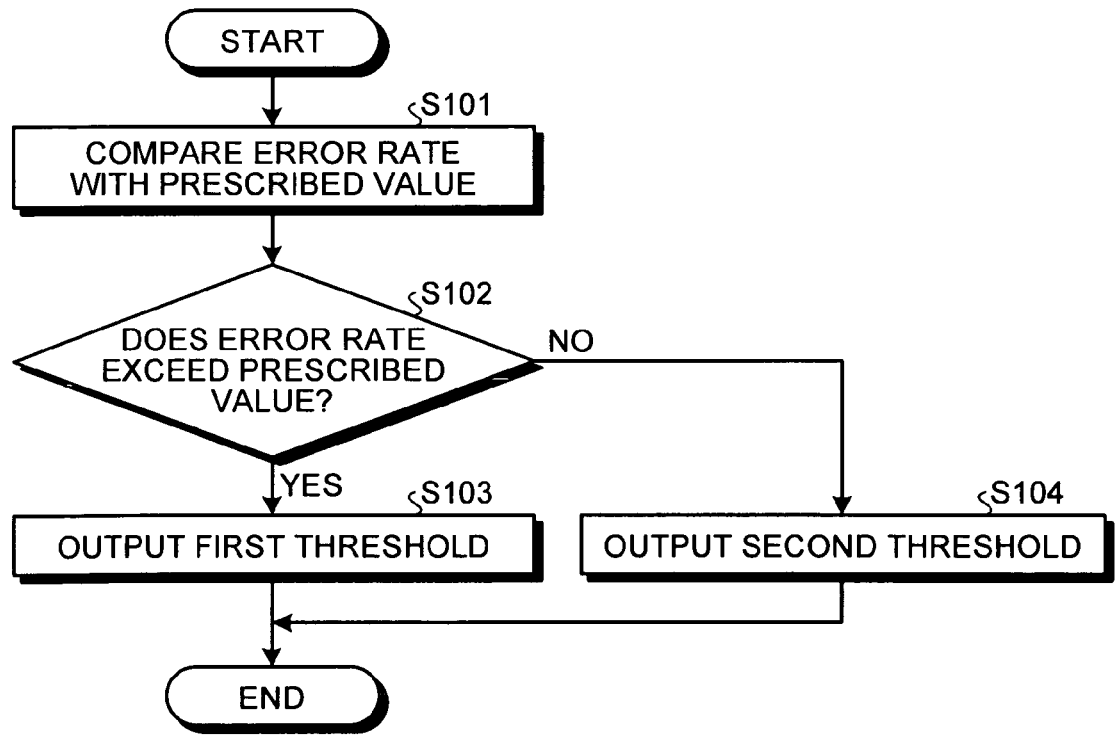
FIG. 8 is a flowchart of a flow of processes carried out by a threshold specifying unit.

A processing operation carried out by the threshold specifying unit 150 will then be described referring to FIG. 8. FIG. 8 is a flowchart of a flow of processes carried out by the threshold specifying unit 150. The process flow shown in FIG. 8 is executed repeatedly every time the threshold specifying unit 150 receives an error rate.

The threshold specifying unit 150 compares an error rate with a prescribed value (step S101), and determines whether the error rate exceeds the prescribed value (step S102).

When the error rate exceeds the prescribed value (Yes at step 102), the threshold specifying unit 150 outputs a first threshold (e.g., 0.2) to the waveform converting unit 302 (step S103), and ends the process flow. When the error rate is equal to or smaller than the prescribed value (No at step 102), the threshold specifying unit 150 outputs a second threshold (e.g., 0.5) to the waveform converting unit 302 (step S104), and ends the process flow.

As described above, in the first embodiment, a change is given to the clock signal that drives the pulse carver unit 305 to adjust the duty of the clock signal. Because the pulse carver unit 305 shapes an RZ pulse, based on the clock signal, the duty of an RZ waveform can be enlarged by enlarging the duty of the clock signal. As a result, an effect that one optical signal exerts on the other optical signal can be suppressed.

In the first embodiment, the duty of the clock signal is adjusted based on the error rate of an optical signal received by the optical receiving apparatus 200, to which an optical signal is transmitted. This allows setting the duty to lower the error rate of the optical signal.

In the first embodiment, the description is made of the case of changing the duty of an RZ waveform by changing a clock signal applied to the pulse carver unit 305. In a second embodiment, the duty of the RZ waveform is changed by another method to be described in the following.

Figure 9A:
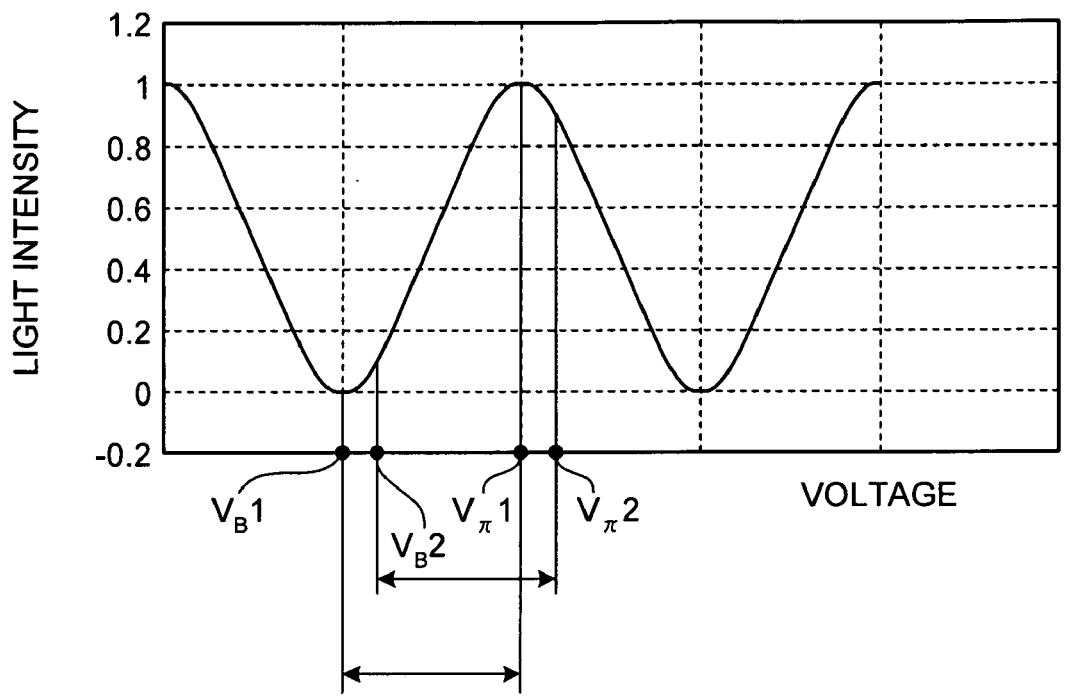
FIG. 9A is an explanatory view of another method of changing the duty of an RZ waveform.

FIG. 9A depicts a waveform that is referred to as the electro-optic response characteristics of an LN modulator. FIG. 9A shows plotted light intensity that is output from the LN modulator when a bias voltage is fluctuated when no clock signal is input to the LN modulator.

Usually, a bias voltage applied by the bias voltage applying unit 304 to the pulse carver unit 305 provided as the LN modulator is set to a voltage value denoted by VB1 at which light intensity is the minimum. At this time, to the pulse carver unit 305, a periodical voltage having a voltage value ranging from the voltage value denoted by VB1 to a voltage value denoted by Vπ1 is applied based on the bias voltage and a clock signal. As a result, the pulse carver unit 305 outputs an RZ pulse that takes a waveform represented by a solid line in FIG. 9B.

Figure 9B:
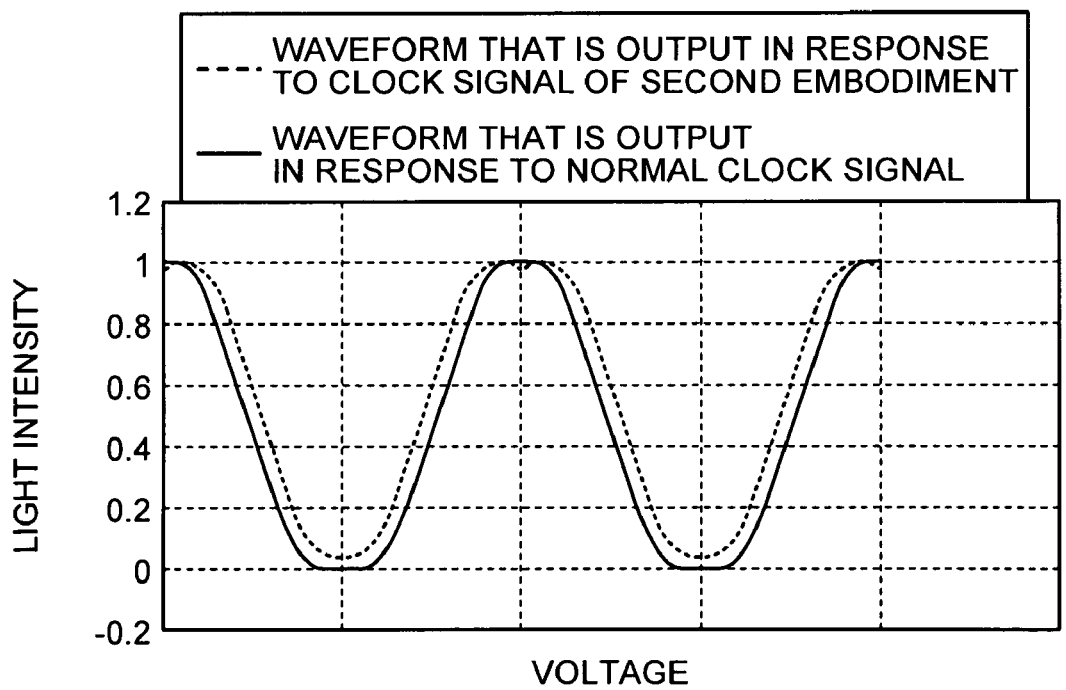
FIG. 9B is an explanatory view of another method of changing the duty of an RZ waveform.

In the second embodiment, to change the duty of the waveform represented by the solid line in FIG. 9B, the bias voltage applied to the pulse carver unit 305 is set to a voltage value denoted by VB2 that is slightly larger than the voltage value denoted by VB1. At this time, to the pulse carver unit 305, a periodical voltage having a voltage value ranging from the voltage value denoted by VB2 to a voltage value denoted by Vπ2 is applied based on the bias voltage and a clock signal. As a result, the pulse carver unit 305 outputs an RZ pulse that takes a waveform represented by a dotted line in FIG. 9B. The waveform represented by the dotted line is greater in duty than the waveform represented by the solid line. In the second embodiment, the duty of the RZ waveform is changed by such a method.

Figure 10:
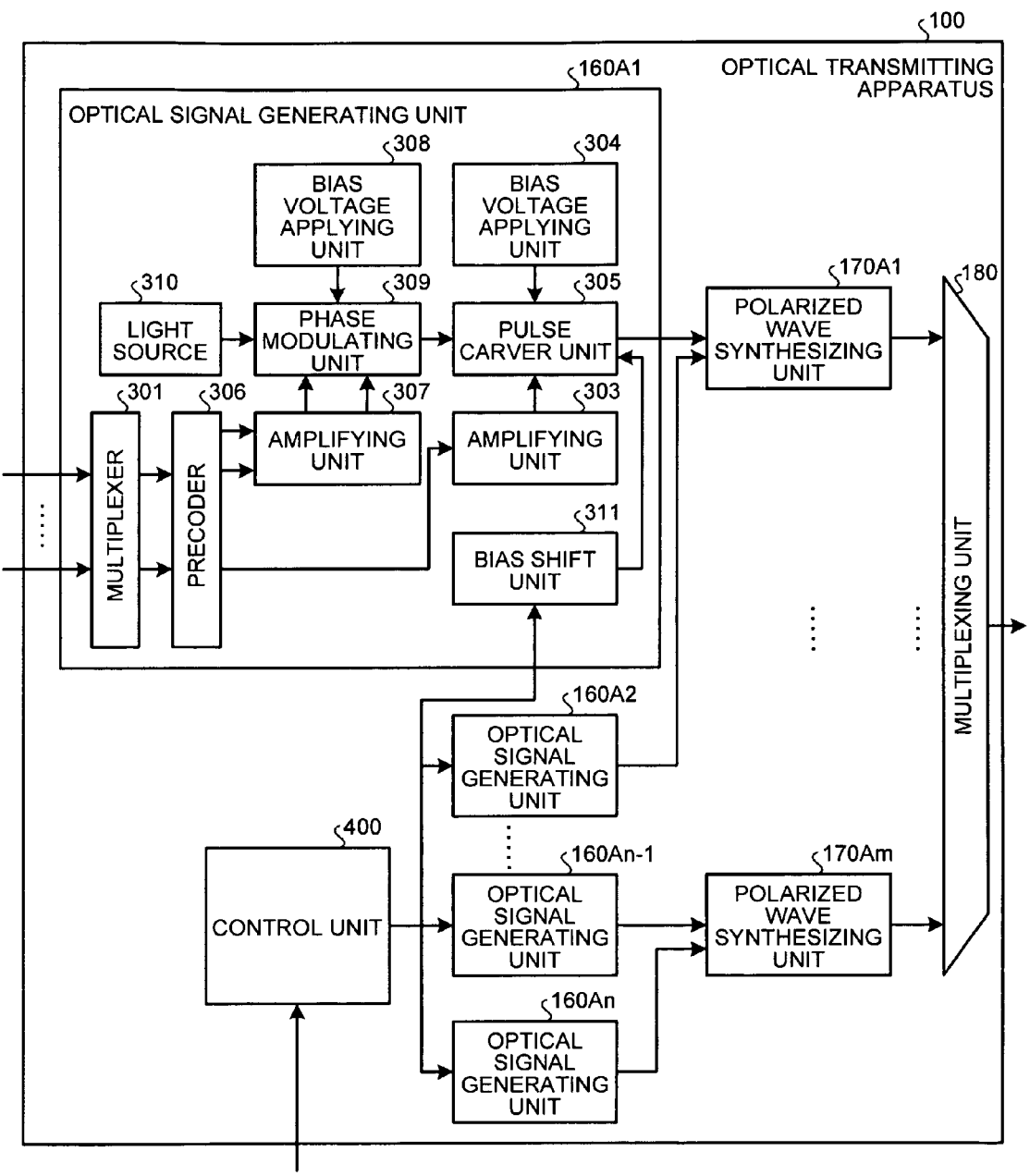
FIG. 10 is a block diagram of a configuration of an optical transmitting apparatus according to a second embodiment.

FIG. 10 is a block diagram of a configuration of an optical transmitting apparatus according to the second embodiment. In the following description, the same constituent elements as the already described constituent elements will be denoted by the same reference numerals denoting the already described constituent elements, and are omitted in detailed description. As shown in FIG. 10, the optical transmitting apparatus 100 includes the optical signal generating units 160A1 to 160An, the polarized wave synthesizing units 170A1 to 170Am, the multiplexing unit 180, and a control unit 400.

Each of the optical signal generating units 160A1 to 160An has the multiplexer 301, the amplifying unit 303, the bias voltage applying unit 304, the pulse carver unit 305, the precoder 306, the amplifying unit 307, the bias voltage applying unit 308, the phase modulating unit 309, the light source 310, and a bias shift unit 311.

The control unit 400 controls the bias shift unit 311, which will be described later, to set a bias voltage applied to the pulse carver unit 305 to a value different from a reference value. Specifically, based on an optical signal error rate at the optical receiving apparatus 200 of FIG. 1, the control unit 400 determines the bias voltage applied by the bias shift unit 311 and outputs a control signal.

The control unit 400 may be incorporated in the optical receiving apparatus 200 as a processing unit that transmits a control signal to the bias shift unit 311, based on an error rate.

The bias shift unit 311 gives a deflection to a reference bias voltage value that is applied by the bias voltage applying unit 304 to the pulse carver unit 305. Specifically, based on a received control signal from the control unit 400, the bias shift unit 311 applies another bias voltage to the pulse carver unit 305. In this manner, application of an additional bias voltage from the bias shift unit 311 gives an offset to the range of a voltage value that is applied to the pulse carver unit 305 based on a clock signal, as described above. As a result, the duty of an RZ pulse output from the pulse carver unit 305 changes.

When the pulse carver unit 305 is provided as an LN modulator, the bias voltage applying unit 304 is installed as a countermeasure against DC (Direct Current) drift. When an operating point changes to go out of a given operating range (e.g., normal voltage fluctuation range shown in FIG. 9A), the bias voltage applying unit 304 detects an error signal and applies a bias to correct the change of the operating point. Based on this fact, an offset may be given to the error signal detected by the bias voltage applying unit 304 to give an offset to the range of a voltage value that is applied to the pulse carver unit 305 based on a clock signal.

As described above, in the second embodiment, the duty of an RZ waveform is enlarged by giving a deflection to the reference value of a bias voltage applied to the pulse carver unit 305. As a result, an effect that one optical signal exerts on the other optical signal is suppressed.

In the second embodiment, a deflection is adjusted based on the error rate of an optical signal received by the optical receiving apparatus 200, to which an optical signal is transmitted. This allows setting duty to lower optical signal error rate.

Figure 11A:
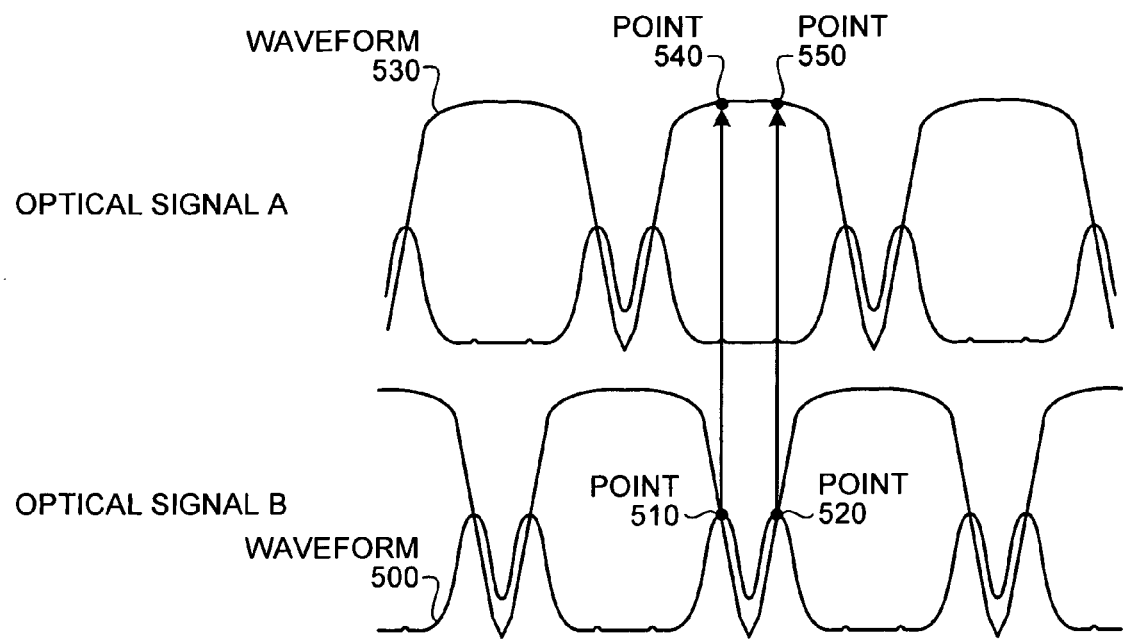
FIG. 11A is an explanatory view of a case where two optical signals synthesized by setting their polarization states orthogonal to each other do not have the identical phase.

The description is made in the first embodiment of the fact that when the duty of an RZ waveform is changed, a waveform resulting from time differentiation of the RZ waveform accompanies a given period in which an effect exerted on one optical signal virtually disappears. As shown in FIG. 11A, however, when the optical signals A and B synthesized by setting their polarization states orthogonal to each other do not have the identical phase, the light intensity of portions represented as points 510 and 520 on a waveform 500 representing an effect exerted on the optical signal A is added to portions represented as points 540 and 550 on a waveform 530 representing the optical signal A.

Figure 11B:
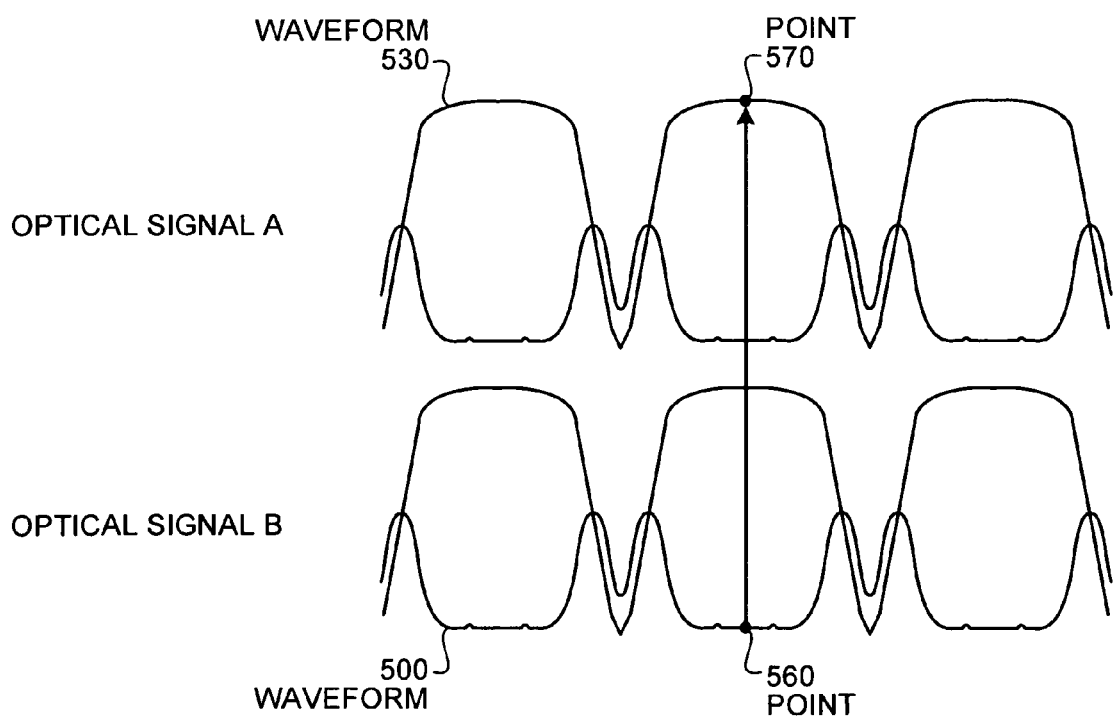
FIG. 11B is an explanatory view of a case where two optical signals synthesized by setting their polarization states orthogonal to each other have the identical phase.

When the optical signals A and B have the identical phase, on the other hand, the light intensity of a portion represented as a point 560 on the waveform 500 is added to a portion represented as a point 570 on the waveform 530, as shown in FIG. 11B. Thus, comparing a case of the optical signals A and B not having the identical phase with a case of the optical signals A and B having the identical phase clearly demonstrates that less effect exerted on the central portions of the waveform results in the case of the optical signals A and B having the identical phase. In a third embodiment, the duty of an RZ waveform is changed and the phase relation between the optical signals A and B is adjusted as well.

Figure 12:
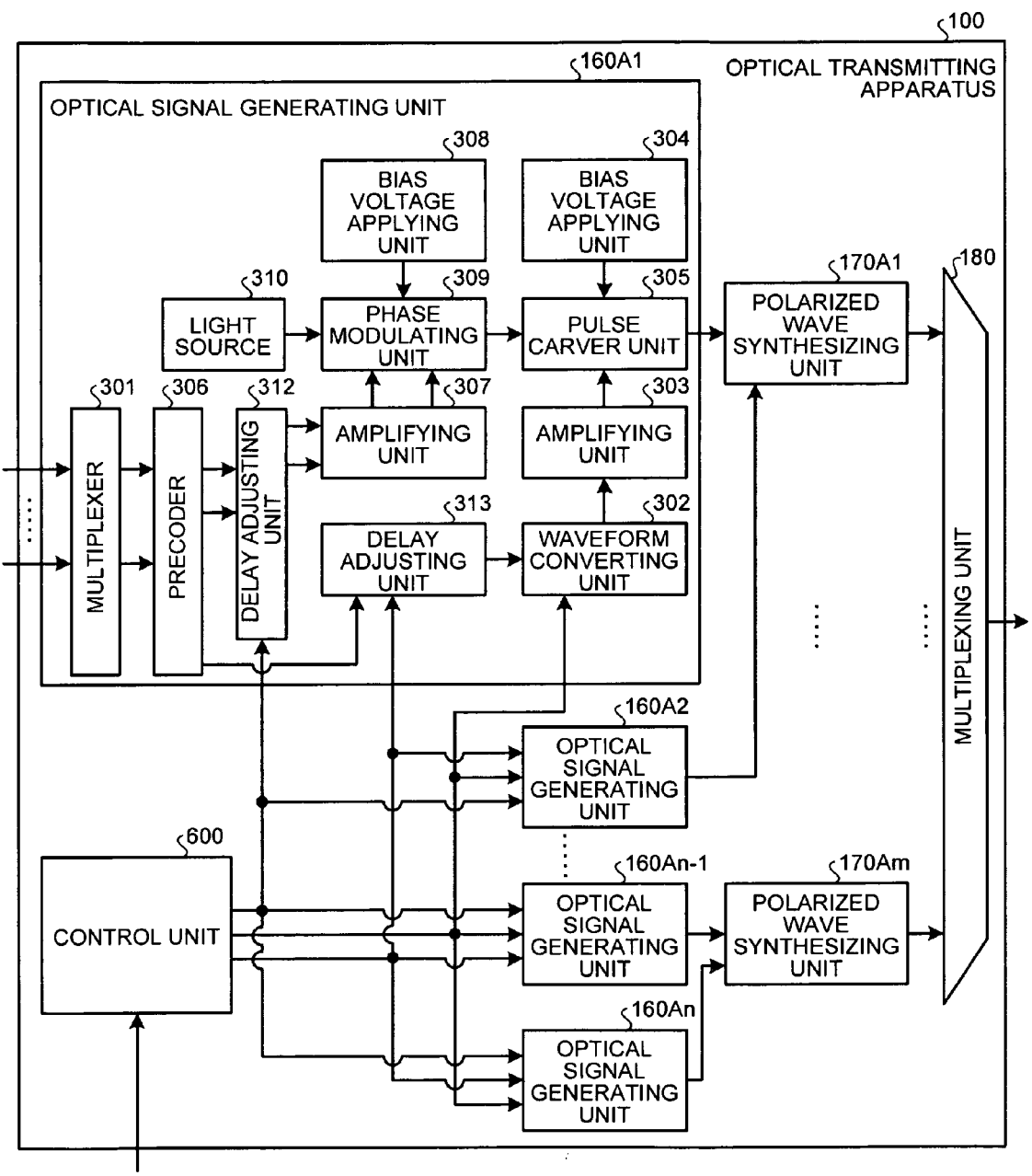
FIG. 12 is a block diagram of a configuration of an optical transmitting apparatus according to a third embodiment.

A configuration of an optical transmitting apparatus according to a third embodiment will be described referring to FIG. 12. FIG. 12 is a block diagram of the configuration of the optical transmitting apparatus of the third embodiment. In the following description, the same constituent elements as the already described constituent elements will be denoted by the same reference numerals denoting the already described constituent elements, and are omitted in detailed description. As shown in FIG. 12, the optical transmitting apparatus 100 includes the optical signal generating units 160A1 to 160An, the polarized wave synthesizing units 170A1 to 170Am, the multiplexing unit 180, and a control unit 600.

Each of the optical signal generating units 160A1 to 160An has the multiplexer 301, the waveform converting unit 302, the amplifying unit 303, the bias voltage applying unit 304, the pulse carver unit 305, the precoder 306, the amplifying unit 307, the bias voltage applying unit 308, the phase modulating unit 309, the light source 310, a delay adjusting unit 312, and a delay adjusting unit 313.

The control unit 600 controls the waveform converting unit 302 to adjust the duty of a clock signal, and also controls the delay adjusting units 312 and 313 to delay the phase of an optical signal output from the optical signal generating unit 160A1. Specifically, the control unit 600 determines the delay rate of a phase, based on an optical signal error rate at the optical receiving apparatus of FIG. 1, and outputs a control signal based on the determined delay rate to the delay adjusting unit 312 and to the delay adjusting unit 313. Similar to the threshold specifying unit 150 described in the first embodiment, the control unit 600 determines a threshold used by the waveform converting unit 302, based on the error rate, to output the determined threshold to the waveform converting unit 302.

The control unit 600 may be incorporated in the optical receiving apparatus 200 as a processing unit that transmits the threshold to the waveform converting unit 302 based on the error rate, and that transmits the control signal to the delay adjusting unit 312 and to the delay adjusting unit 313.

The delay adjusting unit 312 delays a driving signal output from the precoder 306, which driving signal drives the phase modulating unit 309 provided as an LN modulator. Specifically, the delay adjusting unit 312 delays the driving signal, based on the received control signal from the control unit 600.

The delay adjusting unit 313 delays a clock signal output from the precoder 306, which clock signal drives the pulse carver unit 305 provided as an LN modulator. Specifically, the delay adjusting unit 313 delays the clock signal, based on the received control signal from the control unit 600.

As described above, in the third embodiment, the delay adjusting units 312 and 313 giving a change to the phase of an optical signal output from the pulse carver unit 305 are provided to control each unit to adjust a phase delay rate, based on an optical signal error rate at the optical receiving apparatus 200. Through this process, the phases of two optical signals output from a set of optical signal generating units that generate optical signals of the same wavelength are kept identical to suppress an effect that one optical signal exerts on the other optical signal.

Adding the delay adjusting units 312 and 313 to the configuration of the optical transmitting apparatus of the second embodiment provides the same effect as achieved in the third embodiment.

The apparatus of the present disclosure changes the duty of the waveform of an RZ pulse to reduce effects exerted each other by optical signals subjected to polarization multiplexing, thus capable of suppressing a quality deterioration resulting from polarization mode dispersion.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An optical transmitting apparatus that converts input data into an optical signal shaped into an RZ pulse, and synthesizes two optical signals of the same wavelength by setting polarization states of the two optical signals orthogonal to each other to transmit the synthesized signal, comprising:
   a clock signal shape changing unit that changes a clock signal as a periodical voltage fluctuation to drive a pulse shaping unit that converts the input data into the optical signal shaped into the RZ pulse; and
   a duty adjusting unit that controls the clock signal shape changing unit to adjust a duty of the clock signal.

2. The optical transmitting apparatus according to claim 1, further comprising:
   a phase changing unit that changes a phase of the optical signal output from the pulse shaping unit; and
   a phase adjusting unit that controls the phase changing unit to adjust a delay rate of the phase, based on an error rate of the optical signal received by an optical receiving apparatus to which the optical signal is transmitted, wherein
   the duty adjusting unit adjusts the duty of the clock signal, based on the error rate.

3. An optical communication system comprising:
   an optical transmitting apparatus that converts input data into an optical signal shaped into an RZ pulse, and synthesizes two optical signals of the same wavelength by setting polarization states of the two optical signals orthogonal to each other to transmit the synthesized signal; and
   an optical receiving apparatus to which the optical signal is transmitted, wherein
   the optical receiving apparatus includes an informing unit that informs the optical transmitting apparatus of an error rate of the optical signal, and wherein
   the optical transmitting apparatus includes a clock signal shape changing unit that changes a clock signal as a periodical voltage fluctuation to drive a pulse shaping unit that converts the input data into the optical signal shaped into the RZ pulse; and
   a duty adjusting unit that controls the clock signal shape changing unit to adjust a duty of the clock signal, based on the error rate informed of by the informing unit.

4. An optical communication system comprising:
   an optical transmitting apparatus that converts input data into an optical signal shaped into an RZ pulse, and synthesizes two optical signals of the same wavelength by setting polarization states of the two optical signals orthogonal to each other to transmit the synthesized signal; and
   an optical receiving apparatus to which the optical signal is transmitted, wherein
   the optical transmitting apparatus includes a clock signal shape changing unit that changes a clock signal as a periodical voltage fluctuation to drive a pulse shaping unit that converts the input data into the optical signal shaped into the RZ pulse, using given control information, and wherein
   the optical receiving apparatus includes a control information transmitting unit that generates the control information, based on an error rate of the optical signal, to transmit the control information to the clock signal shape changing unit.

* * * * *